United States Patent [19]
Shimizu

[11] Patent Number: 6,042,061
[45] Date of Patent: *Mar. 28, 2000

[54] ROLLER RUNG FOR A CABLE BED

[75] Inventor: Shohachi Shimizu, Gifu, Japan

[73] Assignee: Mirai Industries Co. Ltd., Gifu, Japan

[*] Notice: This patent is subject to a terminal disclaimer.

[21] Appl. No.: 08/971,493

[22] Filed: Nov. 17, 1997

[30] Foreign Application Priority Data

Nov. 28, 1996 [JP] Japan .................................. 8-317792
Nov. 29, 1996 [JP] Japan .................................. 8-319803

[51] Int. Cl.[7] ...................................... F16L 3/16
[52] U.S. Cl. ............................. 248/55; 193/37; 405/154
[58] Field of Search .......................... 248/55, 49, 225.11; 193/35 A, 37; 405/154, 169, 170, 303

[56] References Cited

U.S. PATENT DOCUMENTS

| | | | |
|---|---|---|---|
| 2,917,148 | 12/1959 | Rath | 193/37 X |
| 2,990,929 | 7/1961 | Attwood | 193/37 X |
| 3,252,556 | 5/1966 | Isacsson | 193/37 |
| 3,426,988 | 2/1969 | Bradley et al. | 248/55 |
| 3,770,233 | 11/1973 | McElroy | 248/55 |
| 4,050,561 | 9/1977 | Seitz | 193/37 X |
| 4,221,365 | 9/1980 | Brunskole | 248/55 X |
| 5,645,155 | 7/1997 | Houghton | 193/37 X |
| 5,730,398 | 3/1998 | Shimuzu | 248/55 |

*Primary Examiner*—Derek J. Berger
*Attorney, Agent, or Firm*—Cantor Colburn LLP

[57] ABSTRACT

An improved roller rung for a cable bed to reduce cable traction is disclosed. The roller rung comprises a holder rung having a groove, a plurality of roller drums and a plurality of partition panels. The partition panels are mounted in the groove from above or an end of the groove and securely engaged with the holder rung with panel engagement means. The roller drums turnably engage the partition panels and can rotate freely and independently on axial engagement means substantially above the groove or partially protruding from the groove. Cable weight is securely borne by the partition panels which are supported by the sturdy holder rung, thus the roller rung of the present invention can additionally provide an improved support of cable weight.

15 Claims, 5 Drawing Sheets

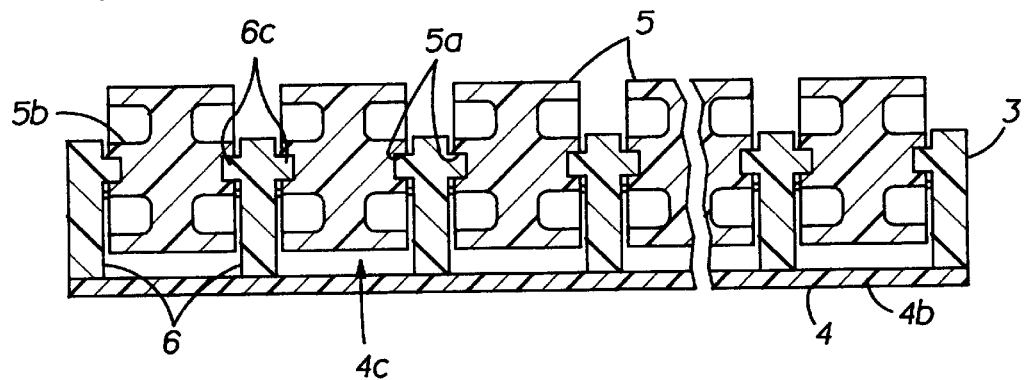
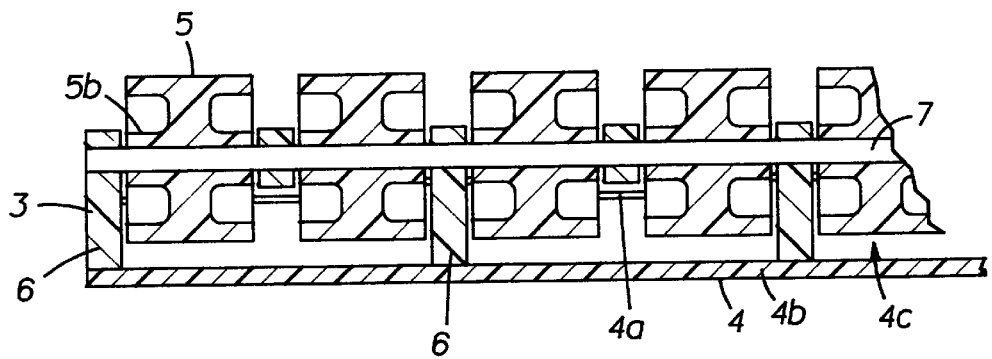

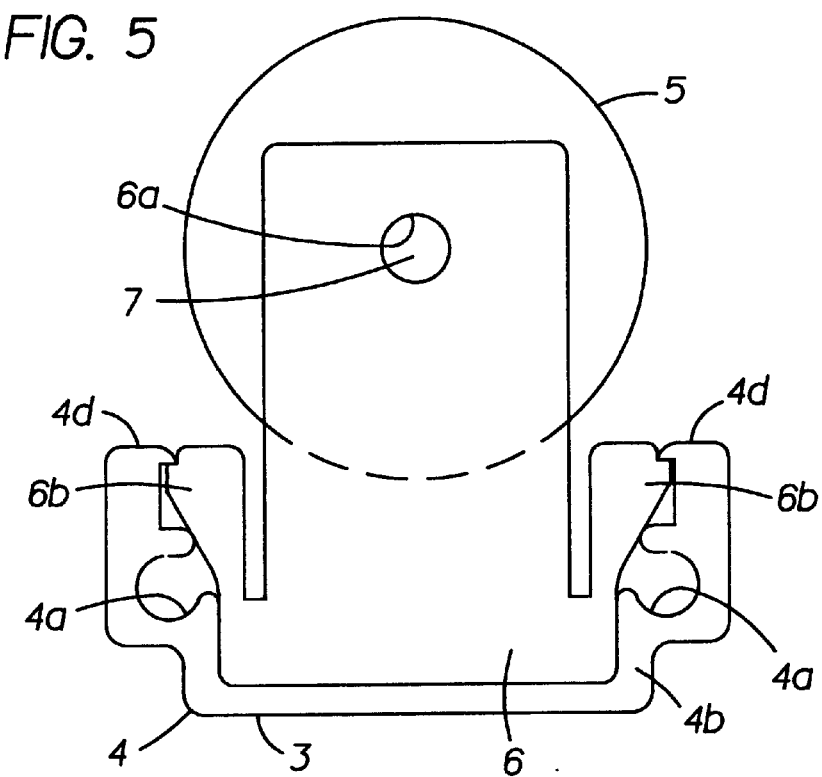
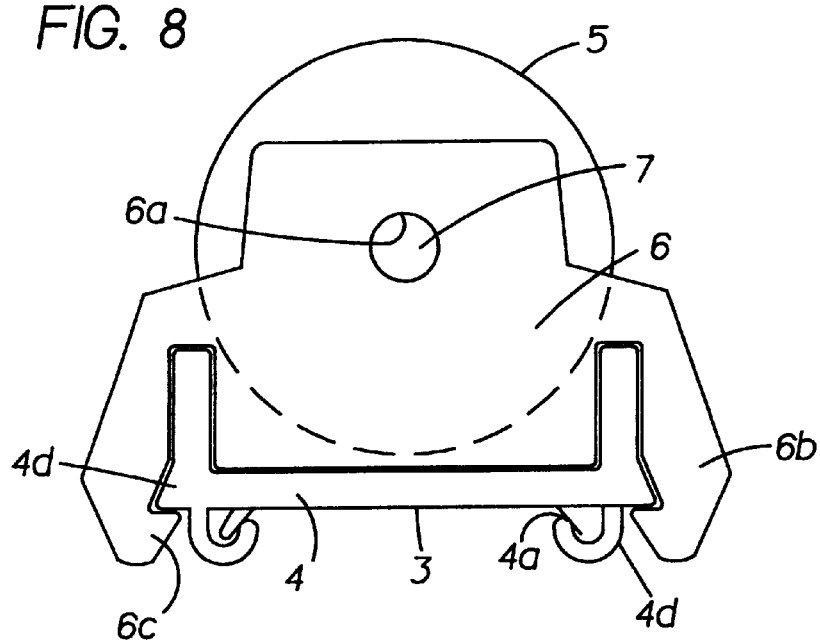

ROLLER RUNG FOR A CABLE BED

BACKGROUND OF THE INVENTION

1. Field of the Invention

This invention generally relates to a roller rung for a ladder-like cable bed or pipe bed to reduce traction force. More particularly, this invention relates to a roller rung for a ladder-type cable or pipe bed which can also bear substantial weight and can be assembled with improved easiness.

2. Prior Art

It is advantageous to utilize rollers in a cable bed to draw and lay a cable (or pipe) on the cable bed with reduced cable traction force, for such a cable is generally heavy and generates considerable friction with the cable floor or rungs when drawn on the cable bed.

U.S. Pat. No. 3,426,988 issued Feb. 11, 1969 to J. Bradley et al. discloses a cable installation roller. Production of this rather complicated roller and a complicatedly formed cable bed intended for this roller is costly. A cable bed should advantageously be as light as possible for easier and safer installation.

This cable bed together with such rollers and roller holding shafts will weigh substantially. Accordingly, installation and safe holding of this cable bed system in place will require an extra sturdy suspension system.

German Patent No. DAS 1,029,630 to H. Krantz (May 8, 1958) discloses a pipe holder roller. This roller is intended for a single pipe and does not provide a very large support power.

Japanese Laid-Open Utility Model Publication 62-172210 discloses a roller rung 11 to be incorporated in a plurality in a ladder-type cable bed 1 as shown in FIGS. 8 and 9. This cable bed 1 comprises a pair of elongated side rails 2, a plurality of support rungs 10 and a plurality of roller rungs 11.

The roller rung 11 comprises a plurality of roller disks 13 turnably mounted on an axial shaft 12 having a bolt hole 12*a* on each end. The roller rung 11 is mounted between the side rails 2 with two bolts 8 screwed through corresponding two holes provided in the side rails 2 into the bolt holes 12*a* from outside of the side rails 2.

The roller rungs 11 are expected to provide easier drawing of cables W shown in phantom onto the cable bed 1. For this reason, it may be advantageous to use many roller rungs 11 in a ladder-type cable bed 1 in place of support rungs 10.

However, it is much more costly to manufacture such a roller rung 11 than a simple support rung 10. Therefore, the number of roller rungs 11 which can practically be incorporated in a cable bed 1 is restricted. The number of total rungs (roller rungs 11 and support rungs 10) to be incorporated in a cable bed 1 is also restricted in view of manufacturing cost and total weight as well as friction generatable between a cable W and support rungs 10.

It is therefore advantageous to provide such roller rungs 11 with an additional function to also substantially bear cable weight to reduce the total number of rungs. However, a conventional roller rung 11 is fragile and cannot support as much weight as a support rung can.

Accordingly, it is an object of the present invention to provide an improved roller rung which can efficiently reduce cable traction force and can also assume the function of a support rung and bear substantial weight.

It is another object of the present invention to provide easy assembling of such a roller rung.

It is another object of the present invention to provide a cost effective cable bed by reducing the total number of rungs.

SUMMARY OF THE INVENTION

The above and other objects of the present invention can be accomplished by incorporating a roller rung of the present invention in a plurality in a ladder-like cable or pipe bed.

A roller rung of the present invention comprises an elongated holder rung having a longitudinally extending groove with a through opening, a plurality of roller drums and a plurality of partition panels to be securely housed in the groove.

The roller drums are to be partitioned and turnably held by the partition panels held in the groove. The holder rung is to be mounted with appropriate connection means between a pair of longitudinally extending side panels.

The roller drums may be turnably engaged with the partition panels by axial engagement means and the roller drums can rotate in cable laying directions on the axial engagement means.

The axial engagement means may be an axial shaft penetrating both the partition panels and the roller drums. Alternatively, the axial engagement means may be engagement between protrusions provided on the partition panels and axial indentations provided on the roller drums, or between indentations provided on the partition panels and axial protrusions provided on the roller drums.

Each of the partition panels may be provided with elastic hook means to easily and fixedly engage with the groove of the holder rung which has receiver hook means to snappingly receive the elastic hook means of the partition panels such that the partition panels can be easily mounted on the holder rung from above to respectively receive the roller drums therebetween, which provides very easy assembling of the roller rung.

Alternatively, the partition panel may have shoulders in place of the elastic hook means to be engaged with the groove of the holder rung having shelves in place of the receiver hook means. This partition panel can be slidingly mounted in the groove from either end thereof, or can be slantingly mounted in the groove from above.

The roller drums are generally provided identical, having an identical diameter, but can vary in axial size as long as they are turnably and securely held on the partition panels.

BRIEF DESCRIPTION OF THE DRAWINGS

The present invention is described in further detail in the following using the accompanying drawings, in which:

FIG. 3 is a sectional view of a roller rung according to another embodiment of the present invention;

FIG. 4 is a sectional view of a roller rung according to another embodiment of the present invention;

FIG. 5 is an end view of a roller rung according to another embodiment of the present invention;

FIG. 8 is an end view of a roller rung according to another embodiment of the present invention;

DETAILED DESCRIPTION OF PREFERRED EMBODIMENT

Figure 1:
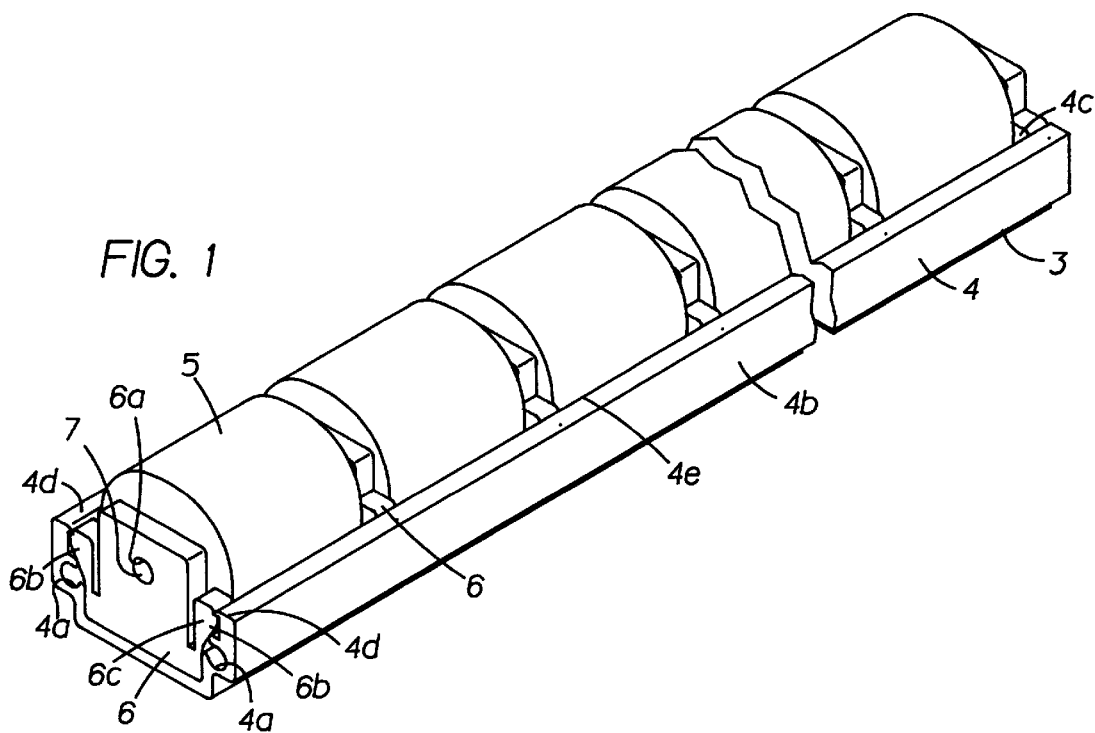
FIG. 1 is a perspective view of a roller rung according to an embodiment of the present invention.

In FIG. 1, a roller rung 3 according to an embodiment of the present invention is shown, comprising a holder rung 4 having a receiver body 4b and a through groove 4c, a plurality of roller drums 5 partially housed in the groove 4c and a plurality of partition panels 6 snappingly fixed within the groove 4c which mount the roller drums 5 therebetween such that the roller drums 5 do not contact any portion of the groove 4c and can freely and independently rotate in cable laying directions.

Figure 2:
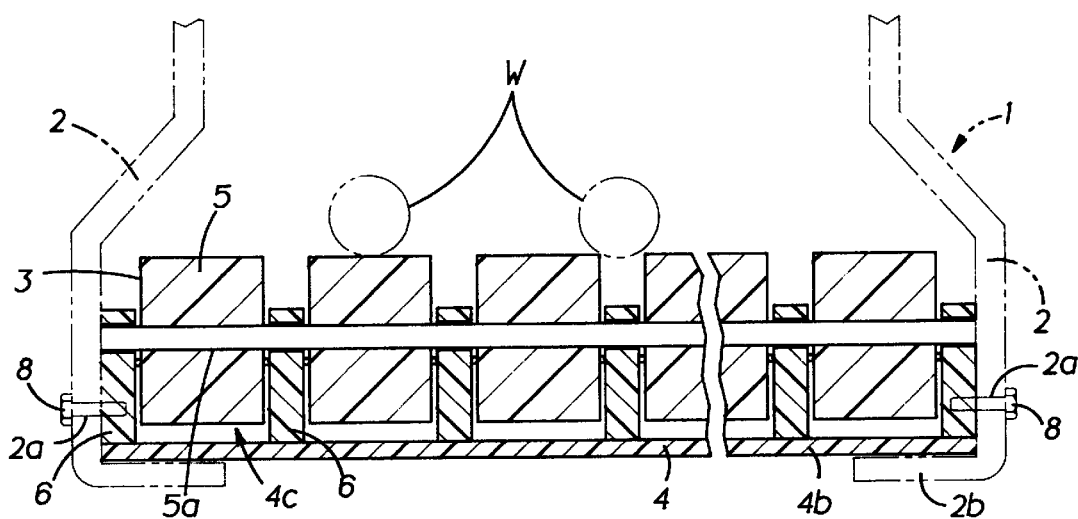
FIG. 2 is a sectional view of the roller rung of FIG. 1.

FIG. 2 shows how the roller rung 3 is incorporated in a cable bed 1 having two side panels 2 which longitudinally extend in parallel. Each side panel 2 made of aluminum (or any other appropriate material) has a longitudinally extending rung shelf 2b and a number of bolt holes 2a which are generally provided in longitudinal alignment.

The groove 4c of the holder rung 4 has a longitudinally extending opening 4e which opens upward. Each partition panel 6 has elastic engagement or hooking means (6b and 6c: FIG. 1) and can elastically or snappingly engage the groove 4c having receiver hook means 4d.

Each partition panel 6 has a through hole 6a and each roller drum 5 has an axial hole 5a. An axial shaft 7 is inserted through the holes 6a and 5a and turnably holds the roller drums 5 such that the roller drums 5 can turn on the shaft 7 without contacting the inner walls of the groove 4c.

A longitudinal bolt bore 4a is provided on each side portion within the groove 4c of the holder rung 4. Unlike those shown in FIG. 1, such bolt bores 4a can be alternatively provided on the outer walls of the holder rung 4. The holder rung 4 is placed on and between the rung shelves 2b and fixed on the side panels 2 with four threaded bolts 8 correspondingly screwed through the bolt holes 2a into the bolt bores 4a. The rung shelves 2b can stably hold the holder rung 4 on the side panels 2.

The receiver hook means 4d can be longitudinal receiver hooks 4d respectively provided on the inner side walls of the groove 4c. Each partition panel 6 has flanges 6b each having an engagement hook 6c, as shown in FIG. 1. The flanges 6b are inwardly deformable elastically and the engagement hooks 6c elastically and respectively engage the receiver hooks 4d of the holder rung 4 when the partition panel 6 is pressed against the groove 4c of the holder rung 4 from above.

The elastic flanges 6b keep pressing the inner walls of the groove 4c, providing secure engagement between the receiver hooks 4d and the engagement hooks 6c. The roller drums 5 can stably and independently rotate on the shaft 7 which is supported at intervals by the partition panels 6. The partition panels 6 are securely held within the groove 4c as they are stably held by means of surface contact around their bottoms with the inner walls of the groove 4c in addition to the engagement between the hooks 4d and 6c.

The receiver body 4b made of aluminum (or any other appropriate material) can be made very sturdy and is held on the sturdy rung shelves 2b. Cable (pipe) weight on the roller drums 5 is sharedly borne by the plurality of partition panels 6. Therefore, considerable cable (pipe) weight can be securely held by the holder rung 4. The partition panels 6 will not fall out of the groove 4c accidentally.

The partition panel 6 may be made of a plastic material. Any other appropriate material may be alternatively used as desired. The roller drum 5 may be made of a plastic material. Any other appropriate material may be alternatively used as desired. The axial sizes or lengths of the roller drums 5 can be different from one another throughout the embodiments of the present invention, if so desired, as long as the roller drums 5 can securely turn.

In FIG. 3, another embodiment roller rung 3 is shown. The partition panels 6 have a cylindrical protrusion 6c on each face except the end partition panels 6 which have only one such protrusion, and the roller drums 5 have an axial indentation 5a on each face, in replacement of the foregoing shaft 7. The indentations 5a whose diameter is slightly larger than that of the protrusions 6c correspondingly receive the protrusions 6c.

If it is desired to lighten the roller drum 5, voids 5b may be appropriately provided in the roller drum 5 as shown in FIG. 3. Voids can be appropriately formed in the partition panels 6 to reduce weight (not shown).

Another roller rung 3 is shown in FIG. 4. In this embodiment, two roller drums 5 are mounted between the partition panels 6. The partition panels 6 and the roller drums 5 may be provided in the groove 4c in other arrangements if desired.

FIG. 5 shows a modified embodiment of the partition panel 6. This partition panel 6 is made somewhat taller relative to the height of the holder rung 4 to receive a roller drum 5 at a higher position, the roller drum 5 providing "better" or securer contact with a cable W or pipe (not shown) since the cable W or soft pipe when bent will not touch any portion of the holder rung 4.

Figure 6:
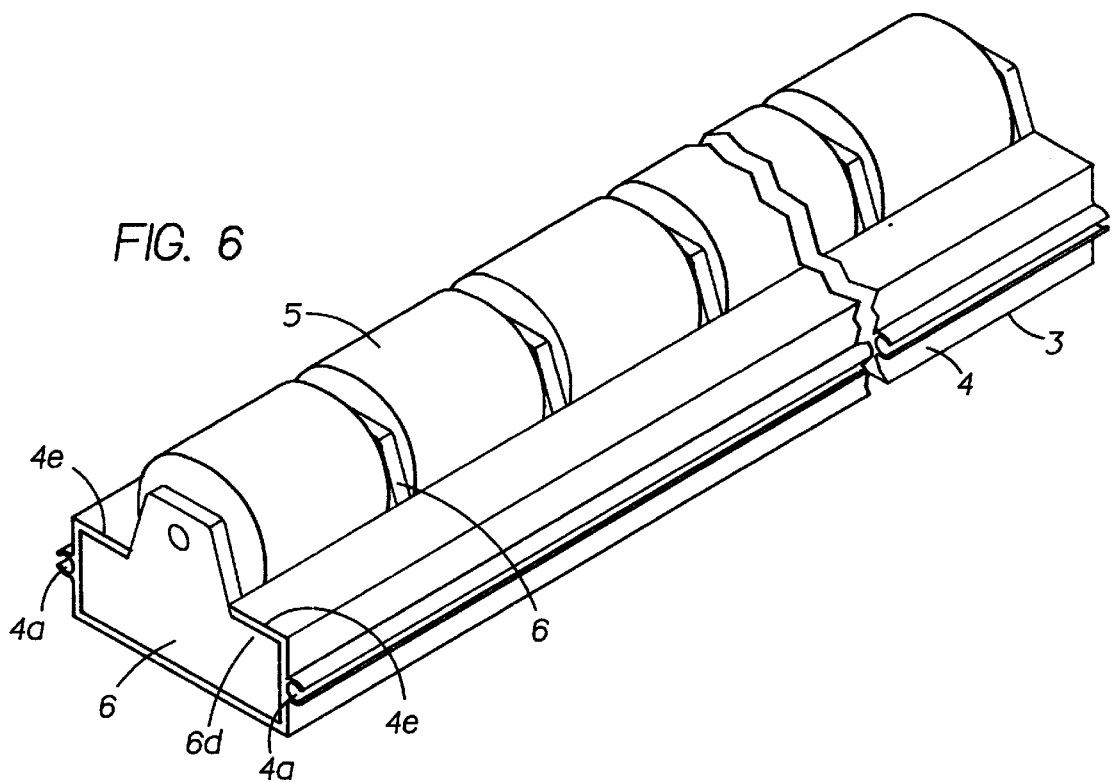
FIG. 6 is a perspective view of a roller rung according to still another embodiment of the present invention.

FIG. 6 shows another embodiment of the roller rung 3, where the roller drums 5 are held "high" with the partition panels 6 having a pair of shoulders 6d, which securely engage the holder rung 4 having a pair of shelves 4e with the shoulders 6d being securely held by the shelves 4e as shown. These partition panels 6 are slid onto the holder rung 4 from an end of the groove 4c or can be slantingly inserted into the groove 4c from above. The orientation of the partition panels 6 is then rectified in the groove 4c.

This roller rung 3 provides a securer contact between drawn cables or pipes and the roller drums 5 and further reduces traction force as the cables or pipes will not touch the holder rung 4 at all.

It is to be noted that the turnable engagement or axial engagement means between the roller drums 5 and the partition panels 6 can be provided by any other appropriate means as long as the roller drums 5 can be securely held and turn between the partition panels 6.

Figure 7:
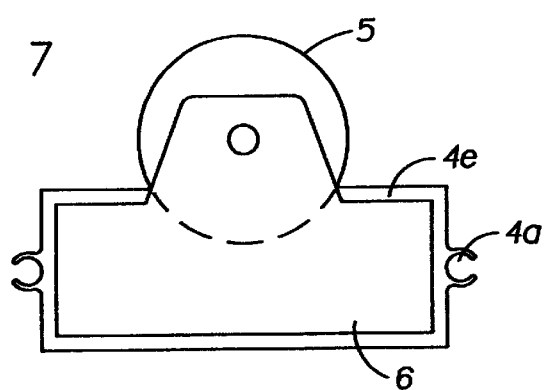
FIG. 7 is an end view of the roller rung of FIG. 6.
Figure 9:
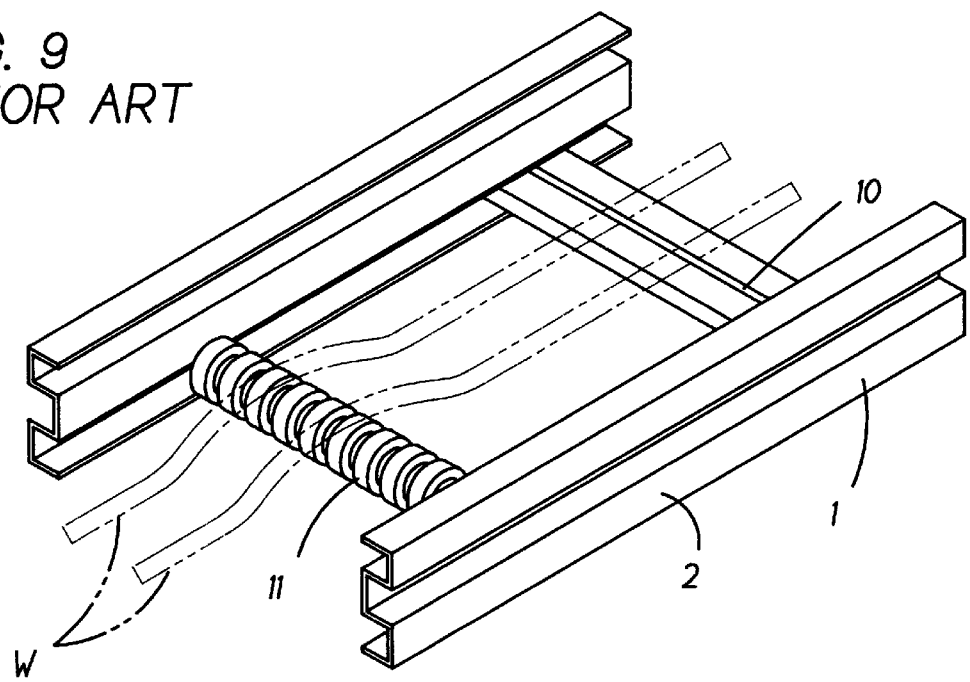
FIG. 9 is a partial perspective view of a conventional cable bed.
Figure 10:
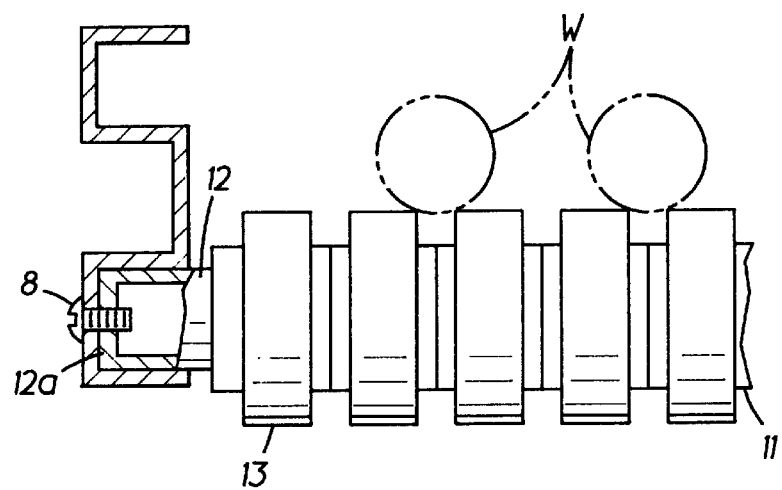
FIG. 10 is a partial front view of the cable bed of FIG. 9.

FIG. 7 shows an end view of the roller rung 3 of FIG. 6. The roller drum 5 is partially received in the groove 4c. It is possible for the roller drum 5 to be held completely above the groove 4c (not shown).

In FIG. 8, still another partition panel 6 is shown, in which the flanges 6b are so provided as to slide vertically outside the holder rung 4 and engage the holder rung 4 outside the holder rung 4 having receiver hooks 4d as shown. The engagement hooks 6c are provided on the inner portions of the flanges 6b, and the receiver hooks 4d are provided on the outer walls of the receiver body 4b. The bolt bores 4a in this embodiment are provided on the bottom surface of the recever body 4b.

The flanges 6b open outwardly as the partition panel 6 is pressed against the holder rung 4 from above and is securely mounted on the holder rung 4. When mounted, the flanges 6b keep pressing the receiver body 4b inwardly, providing secure engagement between the engagement hooks 6c and receiver hooks 4d.

A pipe which can be laid on the cable bed 1 of the present invention may be a water pipe, gas pipe, or practically any hard or soft pipe.

Roller rungs 3 made according to the present invention can bear much greater weight than conventional roller rungs. Therefore, fewer roller rungs 3 of the present invention (than conventional roller rungs) will provide a sufficient roller rung cable bed, substantially reducing support rungs in number.

While it is possible to provide a cable bed 1 having only roller rungs 3 of the present invention, appropriate combinations of roller rungs 3 and support rungs are generally preferred.

The partition panels 6 may be fixedly mounted in the groove 4c in a variety of mounting means. Chemical glue may be utilized or dovetail engagement may be appropriately provided for mounting the partition panels in the groove 4c.

Although the invention has been described with reference to the presently preferred embodiments, it should be understood that various modifications can be made without departing from the spirit of the invention. Accordingly, the invention is limited only by the following claims.

What is claimed is:

1. A roller rung to be incorporated in a cable or pipe bed, comprising:
   a holder rung having a pair of side walls and a groove which opens upward;
   a plurality of partition panels securely mounted in the groove at intervals, each of the plurality of partition panels extending between the pair of side walls; and
   a plurality of roller drums turnably mounted between the partition panels such that the roller drums freely and independently rotate in first directions substantially above the groove, wherein an axis of rotation of the plurality of roller drums is substantially parallel to the the pair of side walls of the holder rung.

2. A roller rung according to claim 1, wherein the plurality of partition panels is elastically inserted into the groove from above.

3. A roller rung according to claim 2, wherein each of the plurality of partition panels includes elastic flanges which are received in receiver hooks provided on said groove to elastically engage the plurality of partition panels.

4. A roller rung according to claim 1, wherein the plurality of partition panels include shoulders formed therein and which elastically engage shelves of the groove to securely retain the plurality of partition panels within the holder rung.

5. A roller rung according to claim 4, wherein the shelves are formed in the pair of side walls of the holder rung.

6. A roller rung according to claim 1, wherein the holder rung includes a first side wall and an opposing second side wall, the first and second side walls partially defining the groove.

7. A roller rung according to claim 6, wherein each of the first and second side walls includes a longitudinal receiver hook formed in an inner surface of the wall, the receiver hooks receiving the plurality of partition panels to securely retain the plurality of partition panels in the groove.

8. A roller rung according to claim 1, wherein the plurality of partition panels includes a first opening and the plurality of roller drums includes a second opening axially aligned with the first opening so that an axial shaft is inserted through the first and second openings for turnably holding the plurality of roller drums in place.

9. A roller rung according to claim 8, wherein the axial shaft is substantially parallel to the groove.

10. A roller rung according to claim 1, wherein each of the plurality of roller drums is disposed between a pair of partition panels.

11. A roller rung according to claim 1, wherein the first direction is substantially perpendicular to the groove in the holder rung.

12. A roller rung according to claim 1, wherein the plurality of partition panels comprises a pair of end partition panels and at least one intermediate partition panel disposed between the pair of end partition panels, the at least one intermediate partition panel having protrusions extending from an inner and an outer surface, the pair of end partition panels including one protrusion extending only from an inner surface thereof.

13. A roller rung according to claim 12, wherein the plurality of roller drums includes an axial indentation complementary to the protrusion which is received in the indentation.

14. A roller rung to be incorporated in a cable or pipe bed, comprising:
   a holder rung having a pair of side walls and a groove which opens upward;
   a plurality of partition panels securely mounted in the groove at intervals, the plurality of partition panels being in elastic engagement with the groove from above; and
   a plurality of roller drums turnably mounted between the partition panels about an axis such that the plurality of roller drums freely and independently rotate in first directions, the plurality of roller drums partially protruding from the groove above the pair of side walls and having an axis of rotation substantially parallel to the the pair of side walls of the holder rung.

15. A roller rung according to claim 14, wherein each of the plurality of partition panels includes elastic flanges which are received in receiver hooks provided on said groove to elastically engage the plurality of partition panels.

* * * * *